(12) United States Patent
Hunter et al.

(10) Patent No.: US 6,538,814 B2
(45) Date of Patent: Mar. 25, 2003

(54) PROJECTION SCREEN HAVING ELECTRIC FIELD RESPONSIVE REFLECTANCE LAYER AND A PHOTOSENSITIVE MATERIAL

(75) Inventors: Andrew Arthur Hunter, Bristol (GB); John Christopher Rudin, London (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/813,828

(22) Filed: Mar. 22, 2001

(65) Prior Publication Data

US 2001/0028501 A1 Oct. 11, 2001

(30) Foreign Application Priority Data

Mar. 22, 2000 (EP) .............................................. 00302315

(51) Int. Cl.⁷ ........................ G03B 21/56; G03B 21/60; G02F 1/1333
(52) U.S. Cl. ...................... 359/449; 359/443; 359/452; 359/459; 349/88
(58) Field of Search .................... 359/449, 443, 359/452, 459; 349/86, 88

(56) References Cited

U.S. PATENT DOCUMENTS 5,193,015 A  *  3/1993  Shanks ...................... 349/115
5,416,617 A  *  5/1995  Loiseaux et al. ............... 349/1
5,420,706 A  *  5/1995  Yamazaki et al. ........... 349/110
5,539,547 A  *  7/1996  Ishii et al. ..................... 349/86
5,929,956 A  *  7/1999  Neijzen et al. .............. 349/113
6,304,309 B1 * 10/2001  Yamanaka et al. .......... 349/156

FOREIGN PATENT DOCUMENTS

| JP | 1-116628 | 5/1989 |
| JP | 1-315723 | 12/1989 |
| JP | 6-102525 | 4/1994 |
| JP | 10-239703 | 9/1998 |

* cited by examiner

*Primary Examiner*—Russell Adams
*Assistant Examiner*—Magda Cruz

(57) ABSTRACT

An active screen reflects a high contrast projected image. The screen has (1) an active layer having visible optical properties changed by an electric field provided by electrodes and (2) a photosensitive layer. The photosensitive layer is such that the electric field across a localized area of the active layer depends on the illumination incident on the photoconductor in that area. The local reflectance of the projection screen thus depends on the intensity of light incident upon it. In one embodiment, the reflectance of the screen increases with increasing light intensity to produce a high contrast reflected image.

21 Claims, 5 Drawing Sheets

PROJECTION SCREEN HAVING ELECTRIC FIELD RESPONSIVE REFLECTANCE LAYER AND A PHOTOSENSITIVE MATERIAL

BACKGROUND OF THE INVENTION

This invention relates to a screen for reflecting a projected image, in particular to an active screen for reflecting a projected image having improved contrast, and to a projection system incorporating such a screen.

When an image is to be viewed by a group of people, it is common to magnify the image by projecting it with a projector onto a screen having a diffusely reflective surface. Screens for indoor use typically have an area of a few square meters, and screens for outdoor use may have an area of 10 $m^2$ or more.

However, ambient light reflected by the screen can cause the image to suffer from poor contrast, requiring a more powerful projector to be used. Although the amount of ambient light can be reduced by viewing the image in a darkened room, this is not always possible and can be inconvenient.

It is known to limit the amount of ambient light reflected towards a viewer by using a reflective material whose reflectance decreases at angles of incidence below about 45 degrees. However, this may result in an undesirable reduction in the range of satisfactory viewing angles. Also, some ambient light will come from the same direction as the projected light, limiting the effectiveness of this approach.

To achieve a high contrast, plasma addressed liquid crystal displays and field emission displays have been used, but these can be expensive when used to form a display whose area is of the order of 1 $m^2$ or above.

SUMMARY OF THE INVENTION

According to one aspect of the invention, there is provided a projection screen for reflecting from a first side a projected image with enhanced contrast, comprising: an active layer whose reflectance can be changed under the influence of an electric field; at least a first electrode for applying an electric field across the active layer; and a photosensitive material whose electrical or dielectric properties can be changed under illumination, wherein the photosensitive material is arranged such that the electrical field across local regions of the active layer is dependent on the illumination incident upon the photosensitive material in each such local region with the result that reflectance of the active layer is locally dependent upon an intensity of light incident upon the first side of the projection screen in that local region.

Preferably, the photosensitive material is a photoconductor adapted to control current through the first electrode. In another advantageous arrangement, there is also a second electrode, whereby the electric field across the active region is applied between the first electrode and the second electrode. In this case, the photosensitive material may be a photoconductor adapted to control current through either electrode.

One of the electrodes may be situated between the first side of the projection screen and the photosensitive material, in which case this electrode is preferably transparent. It will be understood that the term transparent includes the possibility that some absorption will occur.

Because the optical properties of the screen can be changed in localised areas without changing the optical properties of the whole screen, an image with improved contrast and sharpness can be obtained.

Since the screen has a layer structure, it can conveniently be made flat over a large area and mounted vertically, for example on a wall, so that it can be viewed by a group of people.

Since the projection screen does not generate light, it will have a lower power consumption than emissive displays such as field emission displays or cathode ray tubes, and will be more suitable for displaying an image over a large area.

The local reflectance of the screen may be a function of the light incident upon it, in which case an image will be projected onto the front of the screen so that a reflected image can be viewed. In one embodiment, the local reflectance of the screen at a point will increase when the intensity of light incident on the screen at that point is increased. This will cause the screen to reflect more light in the bright areas of a projected image, thereby improving the contrast of the reflected image relative to the contrast which would be obtained with a screen having a uniform reflectance.

An active layer will preferably be used whose reflectance can be changed under the influence of an electric field, such that the active layer can be in a reflective state in which it reflects light, or in a less reflective state in which it reflects less or no light. In those regions of screen where the active layer is in the reflective state, visible light incident on the front of the screen will be reflected, so as to form an image that can be viewed. The active layer may be a normal mode active layer which is in a non reflective state when an electric field above a threshold value is applied across it and in a reflective state when the electric field applied across it is below the threshold value. However, a reverse mode active layer may be used which is in a reflective state only when an electric field above a threshold value is applied.

It will be understood that the bulk and/or interface optical properties of the active layer may be responsible for the changes in reflectance. Preferably, the reflectance of the active layer will be due to light scattering within the bulk of the active layer, and scattering will be reduced when the active layer is in the non reflective state. The active layer may comprise a liquid crystal material. Preferably, the active layer will comprise regions of liquid crystal material or other optically active material embedded in a structural matrix. In a preferred embodiment, the active layer will be a Polymer Dispersed Liquid Crystal material, comprising liquid crystal micro droplets or pockets embedded in a polymer matrix.

Preferably, the active layer will be an electrically insulating layer so that an electric field can be applied across it when desired. However, in one embodiment, the active layer comprises a transparent photoconductor material.

The threshold electric field value at which the active layer makes a transition from a reflective state to a non reflective state will preferably be well defined, in order to selectively switch off the reflectance of the screen in regions where the incident light is below a pre-set value. However, it will be appreciated that the transition will in practice occur within a range of electric field values if for example the micro-droplets are not of a uniform size, or there are other inhomogeneities in the active layer.

Preferably, the pre-set level of incident light intensity at which the active layer changes state will be chosen such that it is above the ambient light level. In the dark areas of the projected image where only ambient light is incident on the screen, the screen will remain dark, thereby improving the contrast of the image. Preferably, a potentiometer or other adjusting means will be provided to adjust the threshold light level at which the active layer changes state, so that the screen can provide good contrast under a range of ambient light conditions. The adjusting means may be manual, or alternatively automatic adjusting means may be provided, comprising an electronic circuit having a light sensor, for example.

The active layer may be transparent when it is in the non reflective state if the screen is used to display a reflected image, in which case an absorbing surface will preferably be located behind the active layer. This will cause the screen to have a dark appearance in the dark areas of the image incident on the screen.

The photosensitive material will preferably be a photoconductor that only conducts under illumination within a predetermined frequency range, at typical operating temperatures such as room temperature. However, a material with a light dependent dielectric constant may be used in the case where current is not required to pass through the photosensitive material.

The photosensitive material may be in the form of a layer situated adjacent to the active layer, between the first and second electrodes. If the photosensitive layer is opaque, then it will preferably be situated behind the active layer, but if the photosensitive layer is transparent, it may be situated in front of the active layer.

In one embodiment, a reverse mode active layer and a layer of photoconductor are situated adjacent to one another, between the first and second electrodes. At the points where light of sufficient intensity is incident on the screen, the photoconductor will conduct, thereby increasing the electric field across the active layer and the reflectance of the active layer at those points. In the regions where the photoconductor remains insulating, the electric field across the active layer will not change significantly. Since in this embodiment the active layer is an insulator, no significant current flows through the photoconductor, and little power is consumed.

In another embodiment, the photoconductor will form part of the active layer, such that the active layer comprises regions of liquid crystal material or other optically active material embedded in a structural matrix, wherein each region of liquid crystal is bounded at least in part by a layer of transparent photoconductor.

In another embodiment, the active layer will comprise a plurality of separated regions of optically active material embedded in a structural matrix of transparent photoconductor material. The active layer will preferably be contacted on each side by a first electrode and second electrodes respectively so that an electric field can be applied across the active layer in the regions where the photoconductor is in the insulating state.

At least the first electrode may be structured with high and low resistance regions such that a local electric field can be applied across the active layer when a current is passed through the first electrode. This will allow adjacent localised areas of the screen having different levels of illumination to have a different reflectance, thereby preserving the sharpness of the reflected image. The first electrode may be patterned as a unitary part, or the low resistance regions may be deposited on a high resistance sheet. Alternatively, the low resistance regions may be formed from a low resistance matrix. The high resistance regions may be formed by resistive links in electrical contact with the photoconductor. The first electrode will thereby provide low resistance delivery of current to a plurality of high resistance regions.

So that light can be reflected by the active layer without significant attenuation, the photoconductor will preferably be located behind the active layer in the direction of incident light. In order to allow sufficient light to reach the photoconductor when the active layer is in the reflecting state, a plurality of windows may be provided through the active layer. The windows may have side walls that are aligned perpendicular to the surface of the active layer, or alternatively the side walls may be inclined in order to control the solid angle within which light can pass through a window and reach the photoconductor.

An optical element such as a lens may be provided in each window to further control the solid angle within which light can pass through a window and reach the photoconductor.

Alternatively, the photoconducting material may extend though the windows in the active layer and make electrical contact with the first electrode and the second electrode, which will be situated on either side of the active layer. When light is incident on the photoconductor, a conducting path will be formed between the two electrodes, which will reduce the electric field across the active layer in the region where the conducting path has been formed, and increase the reflectance of the screen in that region.

The projection screen may comprise at least a third electrode, the screen being arranged such that the active layer lies between the first electrode and the second electrode, and the photoconductor is between the first electrode and the third electrode. Current passing through a region of photoconductor will pass through the first and third electrodes, which will alter the potential in one or more regions of the first electrode and will consequently change the electric field across the active layer in those regions.

The second electrode will preferably be a low resistance electrode, and if a third electrode is used, this will also be a low resistance electrode, so that each of these electrodes remain close to an equipotential in order to reduce the risk that the contrast of the reflected image will be distorted, particularly if a current is passed through an electrode. One or more of the electrodes will be preferably planar, to make the electric field across the active layer more controllable.

In some situations such as outdoors, the ambient light level may be similar to or higher than the light levels of the visible projected image. Therefore, a control image in the near infra red or other invisible wavelength range may be added to the projected light forming the visible image on the screen, the control image being representative of the intensity distribution of the visible image.

The screen will preferably be adapted such that the optical properties of the screen are only affected by the control image. In one embodiment, the screen will be adapted such that the optical properties of the screen only change in response to light incident on the screen within a pre determined range of solid angle, and angle of incidence of the visible image and the control image will be different, such that the optical properties of the screen only change in response to the control image.

Alternatively, or in addition, a photosensitive material that is not significantly sensitive to visible radiation may be used so that the reflectance or other optical properties of the screen are controlled by the control image. This will allow the screen to be in a non reflective state in the dark areas of the image, even if the visible ambient light level is high.

If a photoconductor is used that is sensitive to visible radiation, a filter may be provided to shield the photoconductor from radiation in the visible range. Alternatively, the photoconductor may be shaped so that its volume forms a resonant cavity tuned to the desired wavelength.

The control image may be inverted with respect to the visible image, such that maxima in intensity in the visible image correspond to minima in the infra red image. If such an inverted image is formed, a screen will be used where the reflectance decreases with increasing light intensity.

It will be understood that the intensity of the control image will not necessarily be proportional to intensity of the visible image at each point. The functional relationship between the intensity of the control image and that of the visible image may be non linear, to compensate for the fact that the reflectance of the screen in the visible range may not be proportional to the intensity of invisible light incident upon it.

Since a screen will be used as part of a projecting system, according to a yet further aspect of the invention, there is provided a projection system, comprising a projection screen as described above and a projector for projecting an image on the projection screen.

The projector may be adapted to project an invisible control image onto the screen and the screen may be adapted so that the reflectance at different points on the screen is determined at least in part by the light intensity of the control image at those points. The control image can then be used to increase the contrast of a visible image projected coincidentally with the control image. Alternatively, the projector may only project a control image, and the control image may be used to modulate the reflectance of ambient light on the screen, so that ambient light reflected from the screen forms an image representative of the control image.

The control image and the projected image may be projected onto the screen by separate projectors, in which case the projection system will comprise a main projector for projecting a visible image and a control projector for projecting the control image. Advantageously to achieve most effective contrast, the invisible control image may be provided at a higher resolution than the visible image.

A projector may project the control image onto the front of the screen, in which case the reflectance of the screen will be controlled by the control image. Alternatively, a control image projected onto the back of the screen may be used to control the reflectance on the front side of the screen, so that a visible reflected image may be formed thereon.

The projection system may be used to produce a colour image. In one embodiment, to produce an image that is in colour, the projector will be adapted to project a sequence of monochrome images, each monochrome image having a different single colour, wherein the monochrome images are projected one after another sufficiently rapidly that they are perceived as a single image having a plurality of colours. Each monochrome image will preferably be produced by projecting a control image simultaneously or immediately before a single colour is projected onto the screen.

Where the control image is invisible, visible light which is uniform or which carries a different pattern to the control image may be projected onto the screen to form a visible display corresponding to a representation of the control image. Since the image is formed by changing the optical properties of the screen rather than by electroluminescence or photoluminescence, this yet further aspect of the invention provides a simple way of viewing an invisible image.

Preferably, the reflectance or the transmission of the screen will be controlled by the control image, so that at each point on the screen, visible light incident on the screen remains at the same frequency when it is reflected or transmitted by the screen.

The source of invisible radiation may be a projector, and the control image projected onto the screen may control the screen's reflectance, so that light such as visible ambient light falling uniformly on the screen is non uniformly reflected by the screen and forms of an image thereon which can be viewed. Alternatively, a white light source may be placed behind the screen, and the control image may be used to control the transmission of the screen at different points.

The source of invisible radiation may occur naturally, and may be formed by hot objects emitting black body radiation, such as burning wood in a fire. The display screen may be used as a visor on a fireman's helmet, so that he is better able to see hot objects.

In another embodiment, the display system is used as an infra red night vision system, and visible light incident on the screen is optionally provided by an electrically powered light source.

BRIEF DESCRIPTION OF THE DRAWINGS

The invention will now be further described, by way of example, with reference to the accompanying drawings, in which.

DETAILED DESCRIPTION OF SPECIFIC EMBODIMENTS

Figure 1:
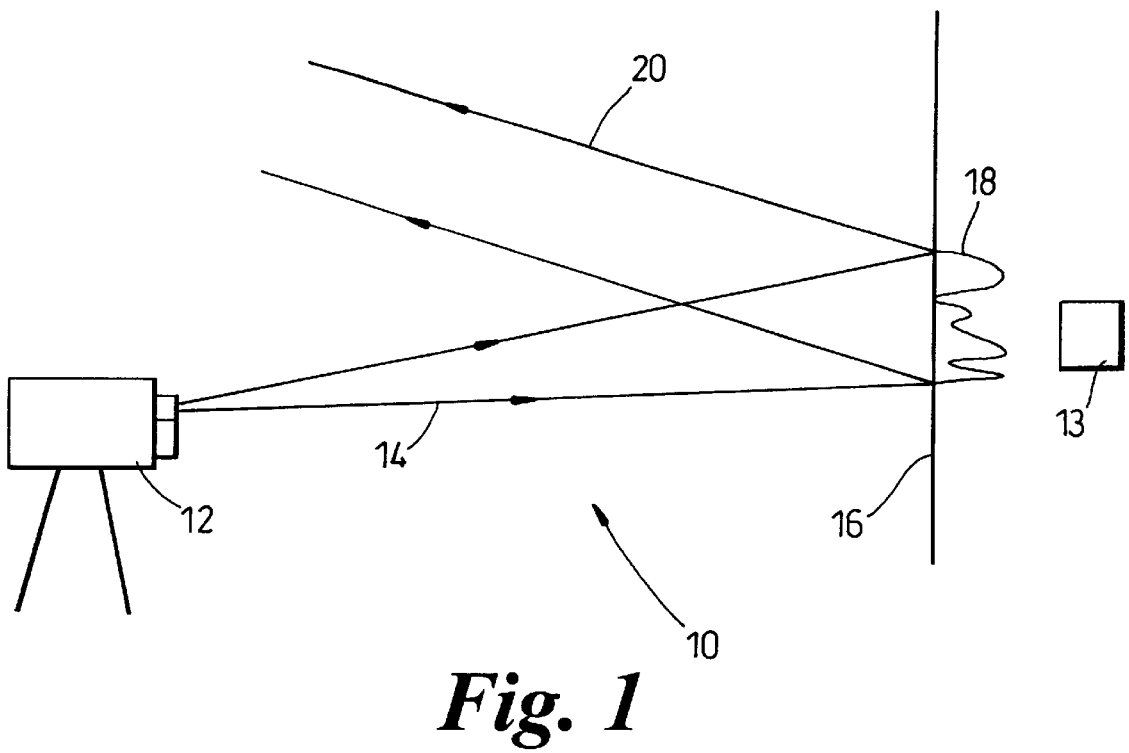
FIG. 1 shows a projection system according to the invention for viewing an image on a projector screen.

In FIG. 1, a projection system 10 is shown in cross section having a projector 12 which projects incident light 14 onto a projector screen 16, where it forms a magnified image 18. The incident light 14 is reflected by the projector screen 16 so that the image can be viewed. For clarity, reflected light 20 is shown reflected from the screen in one direction only, but in practice incident light 14 will be scattered or otherwise reflected in a range of directions by the screen 16, so that the image 18 can be viewed in different locations with respect to the projector 12.

Figure 2:
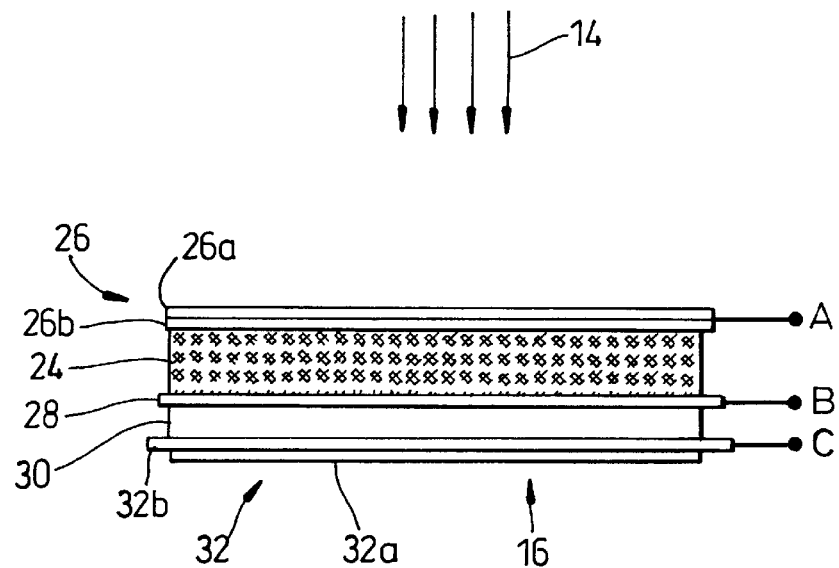
FIG. 2 shows a cross sectional view of a portion of the projector screen according to a first embodiment of the invention.

A cross sectional representation of a first embodiment of the screen 16 is shown in FIG. 2. The screen 16 has a layer structure comprising an active layer 24 of material whose optical properties can be altered under the influence of an electric field. Here, the active layer is made from Polymer Dispersed Liquid Crystal (PDLC). In the relaxed state when no electric field is applied, the active layer 24 causes light to scatter, such that the effect of the active layer is to diffusely reflect incident light 14, but when an electric field is applied, the active layer becomes transparent to light.

A rear electrode 28 (the first electrode) and front electrode 26 (the second electrode) are provided on either side of the active layer 24 so that an electric field can be applied thereacross. The front electrode 26, onto which light 14 from a projector 12 will be incident, is made from a transparent layer of electrically conducting material 26b, here Indium Tin Oxide (ITO), coated onto a layer of transparent plastics material 26a which material forms a substrate. The front electrode 26 is arranged such that the electrically conducting material 26b is located adjacent to one side of the active layer 24.

Behind the rear electrode 28 there is provided a current sink electrode 32 (the third electrode), comprising a plastics material substrate 32a coated with a metal sheet 32b. The rear electrode 28 and the current sink electrode 32 are separated by a photoconducting layer 30 therebetween, the photoconducting layer 30 being chosen such that it only conducts in those areas where it is illuminated. The photoconducting layer 30 will be formed from light-absorbing material such as Organic Photoconductor (OPC) material, optionally with dark pigment, so that it reflects little light and appears dark in colour.

The rear electrode 28 is sufficiently transparent so that light that has travelled through the active layer 24 is able to pass though the rear electrode 28 and into the photoconducting layer 30.

Figure 3:
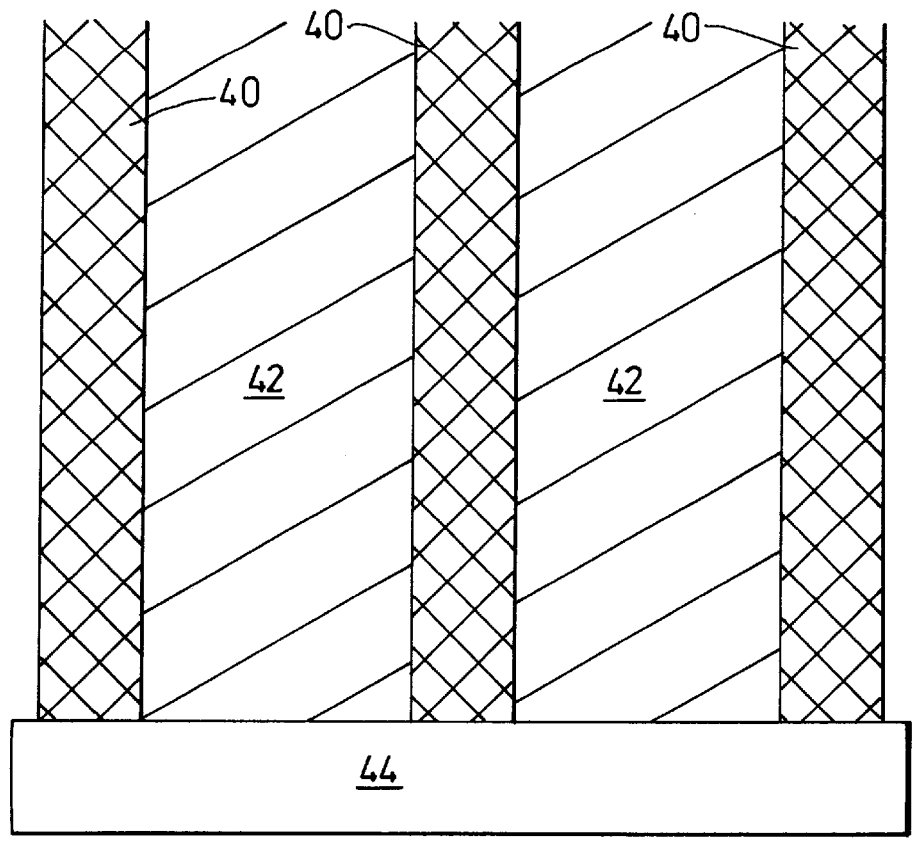
FIG. 3 shows a plan view of a rear electrode in the first embodiment of the invention.

To allow a potential difference to be applied across the active layer 24 in selected localised areas only, the rear electrode 28 is structured with high conductance sections 40 and low conductance sections 42 as shown in FIG. 3. The low conductance sections 42 are formed from a layer of material having a high sheet resistance. The high conductance sections 40 are formed from parallel strips of low resistance material (also known as busbars), which are in electrical contact with the high resistance regions. The rear electrode 28 may be made integrally by thinning a layer of conductive material in the high resistance regions 42, but in this example are made by depositing the low resistance strips 40 on a high resistance sheet. The low resistance (high conductance) strips 40 are aligned in one direction, but they could alternatively be arranged to form a two dimensional grid pattern.

The rear electrode 28 has a contact region 44 situated along at least part of its perimeter, so that an external electrical contact can be formed to at least one end but preferably each end of the high conductance strips 40.

External electrical contacts A, B and C are provided to the front electrode 26, the rear electrode 28 and the sink electrode 32 respectively, so that a respective potential V1, V2, V3 can be applied at the contacts of the respective electrodes 26,28,32.

In one example of a direct current (DC) mode of operation, the potential V3 of the sink electrode 32 is kept between the potential V1 of the front electrode 26 and the potential V2 applied to the contact B of the middle electrode 28; i.e. V2<V3<V1 or V1<V3<V2. The sink electrode 32 is preferably grounded such that V3=0, and in this example V1 and V2 are chosen to be equal and opposite; i.e. V1=−V2. In the absence of strong illumination, there will therefore be a potential of 2V2 across the active layer 24, such that it is maintained in the transparent state. (Typically, V1 will be about −10 V and V2 will be about +10 V).

Under ambient light conditions, the photoconducting layer 30 will not conduct significantly, and the active layer will be in the transparent state, such that light incident on the screen 16 is be absorbed by the photoconducting layer 30, giving the screen a dark appearance.

However, if and where sufficiently strong light is incident on the screen 16, the photoconducting layer 30 will conduct. This will cause a lowering of the local potential Vloc on the rear electrode 28 by an amount ΔV (i.e. Vloc=V2−ΔV). The local potential difference V1−Vloc across the active layer 24 will therefore be reduced by the same amount ΔV. This local reduction in potential ΔV across the active layer 24 will cause the active layer 24 to change locally from a less scattering or transparent state to a more light-scattering state, with the result that the screen 16 becomes more reflective where strong light is shining upon it.

This effect, which can be described as an amplified reflectance effect, increases the contrast of a reflected image, since in the dark parts of the image, where only ambient light is falling on the screen, reflection is reduced and the screen appears dark, whereas in the bright parts of the image, the screen behaves as a white reflective screen, producing a high reflected light intensity.

Another component shown in FIG. 1 is ambient light sensor 13. This can be employed to improve the response of the system to great variations in ambient light. Ambient light sensor 13 is configured to measure the intensity of the prevailing ambient light, and is configured to modify the response of the active layer. For example, the active layer may be adapted to produce a sharp or gradual transition from a fully reflective to a non-reflective state, in order to change the reflectance of the screen in accordance with an incident light intensity. If this transition occurs such that it is above the ambient light level, in the dark areas of the projected image where only ambient light is incident on the screen, the screen will remain dark, thereby improving the contrast of the image. If the ambient light level varies very considerably, it will be highly desirable to vary the response of the system in accordance with the ambient light level (otherwise the system would have to be configured for very high levels of ambient light and hence very bright projection). This could be achieved by manual control of a potentiometer in the circuit determining the electric field—however it will be preferable for this to be arranged automatically in response to the reading of the ambient light sensor 13, which may be an appropriate photoelectric component.

In order to understand more clearly how the change in potential ΔV across the active layer 24 can be achieved in a well localised fashion and thereby produce a well defined image, it should be noted that current can only flow between the rear electrode 28 and the sink electrode 32 at the point or points where light is incident on the photoconducting layer 30. Since the external contact B to the rear electrode 28 is made at the perimeter of this electrode 28, current must flow at least some distance in a lateral direction (parallel to the layers) in the rear electrode 28 before flowing vertically (normal to the layers) through the photoconducting layer 30 at the point where it is conducting.

Current flowing laterally in the rear electrode 28 will predominantly flow along the high conductance strips 40 without causing a significant voltage drop. A significant voltage drop will only occur where current has to flow laterally through a high resistance sheet region 42 in order to reach the point where the photoconducting layer 30 is conducting. Hence the rear electrode 28 will remain substantially at the same potential V2 except in the region between the point where light is incident on the photoconducting layer 30 and the conducting strip 40 nearest to that point. There will be a lateral potential gradient in this region, the minimum potential of V2−ΔV occurring at the point where the photoconducting layer 30 conducts.

The maximum lateral extent over which a significant potential gradient can occur in the rear electrode 28 determines the typical minimum length scale over which the reflectance of the screen 16 can change, and is governed by the spacing between the conducting strips 40. Here, the conducting strips 40 are 10 μm in width, with a periodicity of 100 μm, giving a spacing between strips of 90 μm, which is too small to be easily perceptible to the naked eye. Although little change can occur in the optical properties of the active layer 24 close to the conducting strips 40, the conducting strips occupy a negligible percentage of the surface area of the rear electrode, about 10% of the surface area in this example.

In a favoured mode of operation, an alternating (AC) voltage is applied between the front electrode 26 and the rear electrode 28 in order to reduce the deterioration of the active layer. In one possible configuration, V1 and V3 are kept at ground, and an AC voltage with a square waveform oscillating between −10V and +10V is applied to the rear electrode V2. Since the time averaged field across the active layer is zero, damaging effects such as electromigration within the active layer or charge build up are reduced.

It will be understood that device parameters such as the thickness of the active layer 24, the sensitivity of the photoconducting layer 30 the resistance characteristics of the rear electrode 28 as well as the voltages applied between the electrodes 26, 28, and 32 are interdependent quantities. For example, increasing the thickness of the active layer 24 will increase the potential difference required to maintain it in the transparent state, but will reduce the amount of light reaching the photoconducting layer 32, which will in turn further affect the electric field across the active layer 24. In practice, the device parameters will be chosen such that when the active layer 24 is in the light scattering state, sufficient light is still able to reach the photoconducting layer 30 in order to maintain the active layer 24 in the light scattering state.

Typically, the front electrode 26 will comprise a layer of ITO 26b having a thickness in the range 50 nm to 1000 nm. The thickness of the active layer, PDLC in this example, will typically be in the range 10 μm to 50 μm. The rear electrode 28 will comprise a resistive sheet of ITO typically in the range 25 nm to 1000 nm, which will form the high resistance regions 42, and copper or aluminium conducting strips 42 strips about 1 μm thick deposited thereon. The photoconducting layer 30 will be coated OPC, having a thickness typically in the range 1–20 μm, and the sink electrode 32 will comprise an aluminium coating whose thickness is in the range 1 μm to 20 μm.

Figure 4:
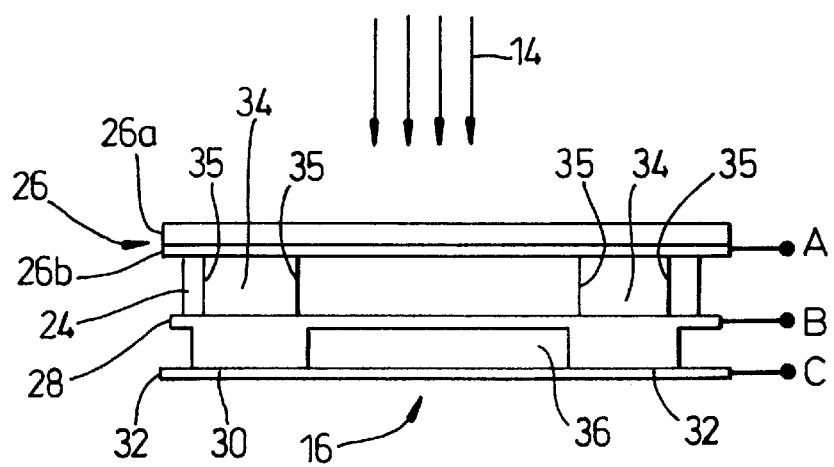
FIG. 4 shows a cross sectional view of a portion of the projector screen according to a second embodiment of the invention.

A second embodiment of the invention is shown in FIG. 4 (parts corresponding to those in the first embodiment have been given the same numerals). This embodiment differs principally from the first embodiment in that windows 34 have been formed through the active layer 24 in order to increase the light intensity incident on the photoconducting layer 30 located behind the active layer 24. The windows are particularly important when the active layer 24 is in the light-scattering state, since otherwise the light could be significantly attenuated before reaching the photoconducting layer 30, with the possible result that the resistance of the photoconducting layer 30 would prevent the active layer 24 from becoming sufficiently scattering.

To further control such a possible feedback effect, the photoconducting layer 30 is structured as shown in FIG. 4 such that the photoconducting material is removed everywhere except behind the windows 34 in the active region 24. However, it will be understood an active layer 24 having windows 34 could be used with an unpatterned photoconducting layer 30. In FIG. 4, the areas where photoconducting material has been removed have been filled with regions of epoxy 36 to maintain the structural strength of the screen 16.

Typically, the windows will have lateral dimensions of about 10 μm, and will be arranged in a two dimensional periodic array having a period of about 100 μm.

In FIG. 4, the windows 34 though the active layer 24 have parallel side walls 35 which are arranged normal to the front and back surfaces of the active layer 24. However, micro lenses may be provided in the windows 34 to control the solid angle within which ambient light is admitted through the windows 34 and onto the photoconducting layer 30 The side walls 35 of the windows 34 may be coated with a light absorbing material to further reduce the effect of ambient light.

Figure 5:
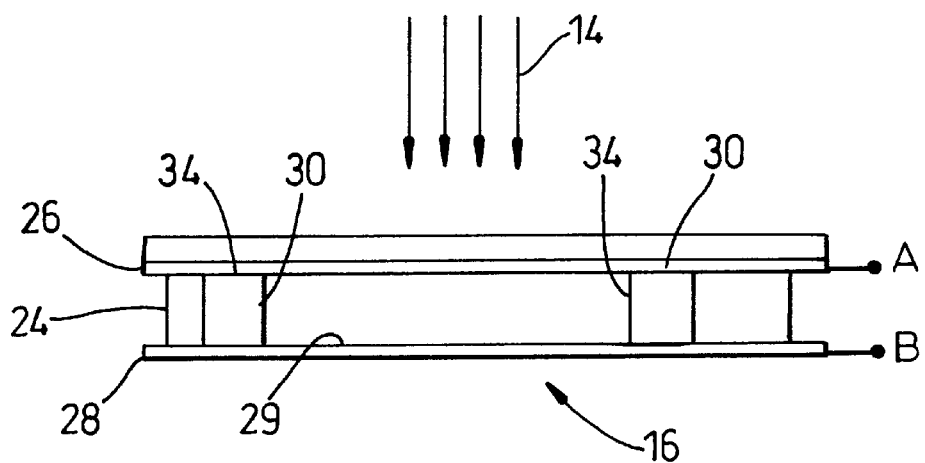
FIG. 5 shows a cross sectional view of a portion of the projector screen according to a third embodiment of the invention.

A third embodiment of the invention is shown in FIG. 5 where the screen 16 comprises a front electrode 26 and a rear electrode 28 with an active layer 24 therebetween. The front electrode is transparent and is structured with high resistance regions 42 and low resistance strips 40 in a similar fashion to the rear electrode shown in FIG. 3 in relation to the previous embodiments. The rear electrode 28 has a light absorbing surface 29 facing the active layer 24, to reduce the reflection of light incident upon it.

The active layer has a plurality of windows 34. Photoconducting pillars 30 are disposed through each window, extending between the front electrode 26 and the rear electrode 28 on either side of the active layer 24.

In operation, a potential difference V is applied to contacts A and B which connect to the front electrode 26 and the rear electrode 28 respectively.

Under ambient light conditions, the light incident on the photoconducting pillars 30 is insufficiently intense to cause these pillars 30 to conduct, and the potential difference V applied across the contacts A and B is present across the active layer 24. The active layer 24 is therefore in the transparent state, and ambient light is transmitted through the active layer to the surface 29 of the rear electrode 28 where it is absorbed, giving the screen 16 a dark appearance.

In the regions of the screen illuminated by projected light, the light intensity is sufficient to cause the photoconducting pillars 30 to conduct, and because of the resistance patterning on the front electrode, the potential difference between the front and rear electrodes 26, 28 diminishes in the vicinity of the one or more pillars 30 caused to be in the conductive state due to the projected illumination 14. The local decrease in potential difference between the front and rear electrodes 26, 28 brings about a decrease in electric field across the active layer 24 which switches the active layer 24 into the light-scattering state in which it reflects light. This results in the local reflectance of the screen 16 being increased in the bright regions of an image where projected illumination is incident on the screen 16, which increase the contrast of the reflected image.

If in any one of the above embodiments the ambient light intensity varies in a periodic fashion, as is the case with many ambient light sources powered by an AC mains supply, the influence of ambient light on the reflectivity of the active layer can be further reduced by modulating the intensity of the projected image with the same frequency as the ambient light, such that the temporal maxima in the projected image intensity and the temporal maxima in the voltages across the active layer coincide with the temporal minima in the ambient light variations.

Alternatively or in addition to improve the contrast of a reflected image yet further, the reflectance of the screen can be varied with the same frequency as that of the ambient lighting, such that the reflectance of the screen is out of phase with the intensity of ambient light, and the screen is at its most reflective when the ambient light intensity is lowest. The reflectance of the whole screen may be varied uniformly, or alternatively only those areas of the screen where the projected image is bright may be varied.

It should be noted that in this and in other embodiments provided temporal synchronisation of the electric field across the active layer is not associated with the intensity of the projected image.

In certain of the embodiments shown, the projection screen may provide better response if the projected image is optimised for the particular optical properties of the projection screen (for example, in embodiments such as those which include optical elements in windows within the screen structure). In these cases, it may be advantageous for the projector 12 to project an image that is optimal for the projection screen 16, rather than that which would be projected onto a conventional projection screen. Projector 12 could be configured to allow switching between a "normal projection" mode and an "active screen projection" mode to achieve this, for example. It is also possible that in certain circumstances an active projection screen 16 may be less effective than a conventional projection screen (with uniform reflection properties) and that the option might be provided for the projection screen 16 to operate in "active" mode (in which case it will behave as indicated here) or in "passive" mode (in which case it will be controlled to provide the response of a normal passive screen).

In a further embodiment, light 14 outside the visible spectrum, such as near infra red radiation, can be used to control the reflectance of the screen 16 by causing an infrared sensitive photoconductor 30 to conduct. A screen having a structure as shown in FIGS. 2, 4 and 5 and a structured electrode as shown in FIG. 3 may be used.

The control image projected by a projector 12 (as shown in FIG. 1) may coincide with a projected visible image. A photoconductor 30 may be used that is insensitive to visible light, thereby reducing the likelihood of ambient light turning the screen 16 into a high reflectance state.

Alternatively, the control image may be projected onto a screen in order to modulate the reflectance of the screen so that ambient light falling on the screen is reflected from the screen, with a spatial intensity that corresponds to that of the control image.

The control image may be projected with the same projector 12 as the visible image, or a separate control projector 13 may be used to project the control image.

Figure 6:
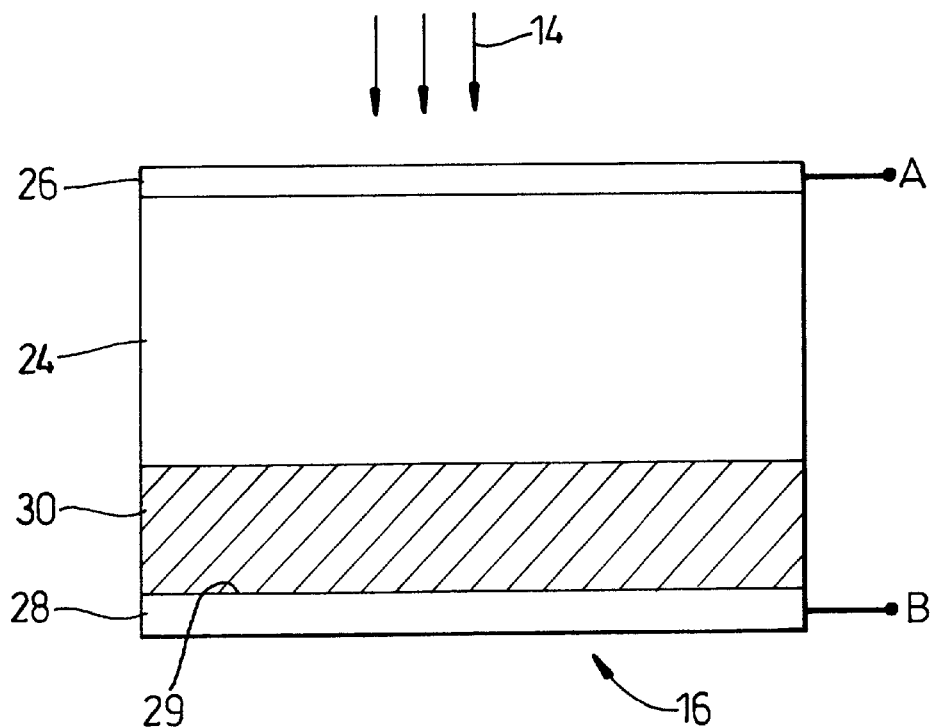
FIG. 6 shows a cross sectional view of a portion of the projector screen according to a further embodiment of the invention.

A further embodiment of the invention is displayed in FIG. 6, where a screen for use with a negative projected image is shown schematically in cross section. Starting from the front side of the screen 16 upon which light 14 is incident, the screen comprises a transparent front electrode 26, an active layer 24 made from PDLC, a photoconducting layer 30 sensitive to infra red light, and a rear electrode 28 having a light absorbing surface 29 which faces the photoconducting layer 30. Contacts A and B are connected to the front and rear electrodes 26,28 respectively.

Both the front electrode 26 and the rear electrode 28 have a low sheet resistance, so that when in operation a potential V is applied between contacts A and B, each electrode 26,28 is an equipotential.

When no infra red light is incident on the photoconductor, the photoconducting layer is an insulator and the potential V is almost entirely dropped in the region between the two electrodes 26,28, and in part across the photoconducting layer 30. The potential V is chosen such the electric field across the active layer 24 is low enough for the active layer to be in the light scattering state, and the screen 16 is therefore reflective.

In the regions where infra red light is incident on the screen 16, the infra red passes through the active layer and causes the photoconductor to conduct locally. This increases the local electric field in the active layer, which remains transparent. The relative thickness of the active layer 24 and the photoconducting layer 30 as well as the voltage V are chosen such that the local increase in electric field across the active layer 24 causes the active layer 24 to switch to the transparent state only in those regions where the photoconducting layer 30 conducts.

Since light is absorbed by the rear electrode 28 where the active layer is transparent, the reflectance of the screen 16 decreased in those regions exposed to infrared. Hence with an inverted infra red image used to control the screen reflectance, a visible non inverted image can be produced with improved contrast.

Generally, where an invisible control image is provided, particularly effective results may be achieved by projecting this image at high resolution and the visible image at lower resolution—it may generally be easier to provide a high resolution invisible image (which could be essentially monochromatic) and a lower resolution colour image, but as the contrast is provided by the invisible image an apparently high resolution colour image can be achieved.

A reverse mode PDLC may be used, whose properties are such that it is in a light scattering or reflecting state when a potential difference is applied across it. Use of a reverse mode PDLC layer as the active layer 24 is particularly appropriate in the embodiment shown in FIG. 6, since light incident on the screen increases the potential across the active layer when a potential is applied across the upper and lower electrodes 26,28. With a reverse mode PDLC layer as the active layer 24, in reflectance of the active layer 24 and screen 16 increases with increasing illumination, so that an inverted control image does not have to be used.

Although the photoconductor 30 in this embodiment is situated behind the active layer 24, if a transparent photoconductor layer 30 is used, such a layer may be situated in front of the active layer 24.

Figure 7:
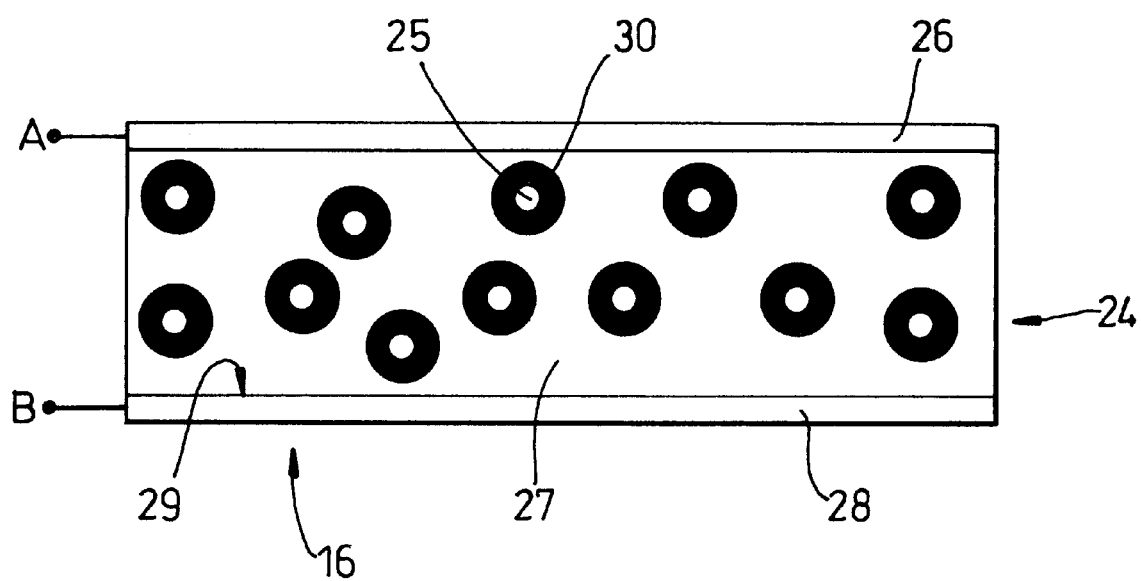
FIG. 7 shows a cross sectional view of a portion of the projector screen according to a yet further embodiment of the invention.

FIG. 7 shows a yet further embodiment of the invention, where an active layer 24 is sandwiched between a front electrode 26 and a rear electrode 28. The active layer 24 comprises micro pockets of liquid crystal material 25 embedded in a structural matrix 27 made from a transparent polymer material. Each pocket of crystal material 25 is surrounded by a layer of transparent photoconducting material 30. When a potential is applied between the electrodes 26,28, some of that potential is dropped across the micro pockets 25, some is dropped across the structural matrix 27, and some is dropped across the photoconductor layer 30. Where light is incident on the screen 16, the photoconducting layers 30 surrounding the micro pockets 25 will conduct, and the photoconducting layers 30 will be close to an equipotential. Therefore, the potential drop across the pockets of liquid crystal material 25 will be at least partially screened, and the electric field across the pockets 25 will decrease. If a normal mode liquid crystal material is used, the decrease in field will cause the liquid crystal to become scattering, such that the active layer is reflective where light is incident upon it. The upper surface 29 of the lower electrode 28 may be coated with light absorbing material so that if the screen 16 is used to reflect a projected image, the screen appears dark in the dark areas of the projected image.

The pockets of liquid crystal material 25 will preferably be randomly arranged, but they may be arranged in a periodic fashion. Typically the pockets will be about 0.2 $\mu$m to 2 $\mu$m in diameter.

In an alternative embodiment, the structural matrix material 27 may be transparent photoconductor material, so that with reference to FIG. 7, the transparent photoconductor layer 30 is part of the matrix material 27. In this embodiment, a significant field across the pockets of liquid crystal material 25 will only be possible when the photoconductor matrix material 27 is in the insulating state. When a potential difference is applied between the upper and lower electrodes 26,28, only in those regions where light is incident on the screen 16 will there be a field across the pockets 25 of liquid crystal material, so that the active layer can switch locally from a reflective to a non reflective state and vice versa.

Figure 8:
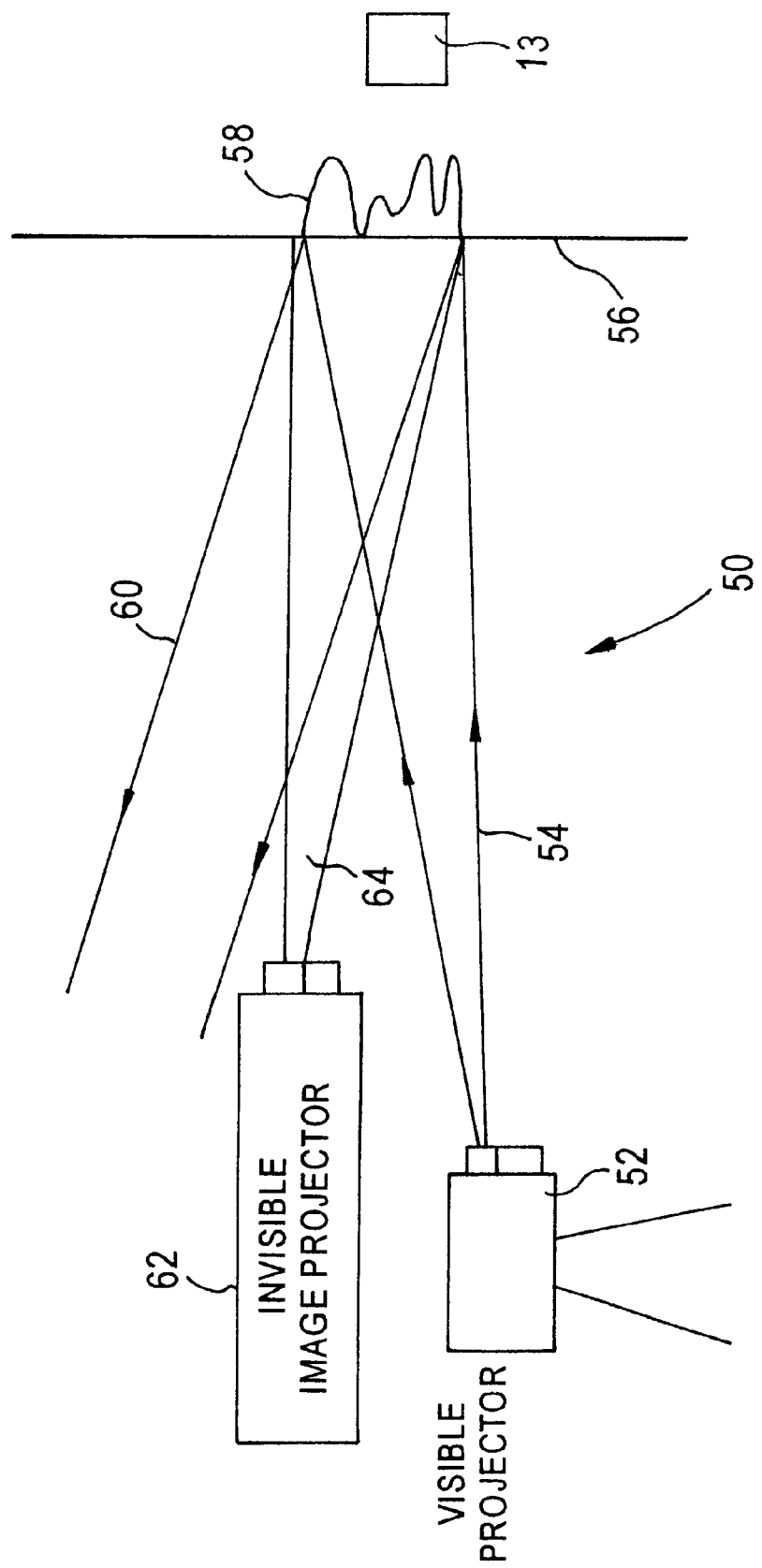
FIG. 8 is a schematic diagram of a projection system including an invisible image projector and a visible projector.

FIG. 8 is a schematic diagram of a projection system including visible projector 52 and invisible image projector 62 which respectively project incident light 54 and invisible light 64 (that is an image) onto projector screen 56. Projector 52 projects a color image having a lower resolution than the invisible image of projector 62. Screen 56 includes photosensitive material predominantly responsive to the image of projector 62 and an active layer having reflectance changed by an electric field, as described in connection with any of the embodiments of FIGS. 2 and 4–7. The incident light 54 and 64 combines in screen 56 to produce image 58 to produce reflected light 60.

As it will be appreciated from the above description, this invention provides different ways of modulating the reflectance of a screen. A visible image can be produced from incident ambient light falling on the screen, or a visible projected image can be reflected with a high contrast.

What is claimed is:

1. A projection screen for reflecting from a first side a projected image with enhanced contrast, comprising: an active layer whose reflectance can be changed under the influence of an electric field; at least a first electrode for applying an electric field across the active layer; and a photosensitive material whose electrical or dielectric properties can be changed under illumination, wherein the photosensitive material is arranged such that the electrical field across local regions of the active layer is dependent on the illumination incident upon the photosensitive material in each such local region with the result that reflectance of the active layer is locally dependent upon an intensity of light incident upon the first side of the projection screen in that local region.

2. A projection screen as claimed in claim 1, wherein the photosensitive material is a photoconductor arranged to control current through the first electrode.

3. A projection screen as claimed in claim 1, wherein the first electrode is disposed between the first side of the projection screen and the photosensitive material and wherein the first electrode is transparent.

4. A projection screen as claimed in claim 1, further comprising a second electrode whereby the electric field across the active region is applied between the first electrode and the second electrode.

5. A projection screen as claimed in claim 4, wherein the photosensitive material is a photoconductor arranged to control current through the first electrode or the second electrode.

6. A projection screen as claimed in claim 4, further comprising a third electrode.

7. A projection screen as claimed in claim 1, wherein the active layer is formed from a liquid crystal material.

8. A projection screen as claimed in claim 7, wherein the liquid crystal material is a polymer dispersed liquid crystal material.

9. A projection screen as claimed in claim 1, wherein the local reflectance of the active layer increases with the intensity of the projected image.

10. A projection screen as claimed in claim 1, wherein there is no temporal synchronization between the electrical field applied across the active layer and the intensity of the projected image.

11. A projection screen as claimed in claim 1, wherein the active layer is transparent when it is not in the reflective state, and the projection screen further comprises an absorbing layer or surface situated on the side of the active layer remote from the first side of the projection screen.

12. A projection screen as claimed in claim 1, wherein the first electrode is structured with high resistance regions and low resistance regions such that an electric field can be applied with high impedance across localized regions of the active layer when a current is passed through the first electrode.

13. A projection screen as claimed in claim 1, wherein the layer of active material has a plurality of windows therethrough.

14. A projection screen as claimed in claim 13, wherein the photosensitive material extends though the windows in the active layer.

15. A projection screen as claimed in claim 13, wherein the windows are arranged so as to form optical elements.

16. A projection screen as claimed in claim 1, wherein the photosensitive material is in the form of a layer.

17. A projection screen as claimed in claim 1, wherein the photosensitive material is predominantly responsive to radiation outside the visible spectrum.

18. A projection system comprising a projection screen as claimed in claim 17 and a first projector for projecting a first image in invisible radiation to which the photosensitive material is responsive, and a second projector for projecting visible light onto the projection screen.

19. A projection system as claimed in claim 18 wherein the second projector projects a colour image at lower resolution than the first image.

20. A projection system, comprising a projection screen and a projector for projecting an image on the projection screen the projection screen being adapted for reflecting from a first side a projected image with enhanced contrast, and comprising: an active layer whose reflectance can be changed under the influence of an electric field; at least a first electrode for applying an electric field across the active layer; and a photosensitive material whose electrical or dielectric properties can be changed under illumination, wherein the photosensitive material is arranged such that the electrical field across local regions of the active layer is dependent on the illumination incident upon the photosensitive material in each such local region with the result that reflectance of the active layer is locally dependent upon an intensity of light incident upon the first side of the projection screen in that local region.

21. A projection system as claimed in claim 20, wherein the projector is adapted to modify a projected image from that projected on to a conventional projection screen in accordance with optical properties of the projection screen of the projection system.

* * * * *